Dec. 17, 1935.   J. B. STRAUSS   2,024,400
HYDRAULIC CELL
Filed Oct. 23, 1933

INVENTOR
Joseph B. Strauss
BY
ATTORNEY

Patented Dec. 17, 1935

2,024,400

UNITED STATES PATENT OFFICE 2,024,400

HYDRAULIC CELL

Joseph B. Strauss, San Francisco, Calif.

Application October 23, 1933, Serial No. 694,733

3 Claims. (Cl. 265—47)

This invention relates to improvements in hydraulic cells.

The principal object of the invention is to produce a hydraulic cell for use in weighing apparatus.

A further object is to produce a cell which is positive in operation, durable and that will support heavy loads without injury to itself.

A further object is to produce a device which is economical to manufacture and one which will be free from mechanical failures under service.

A further object is to produce a cell having a minimum amount of movement.

Other objects and advantages will be apparent during the course of the following description.

Figure 1:
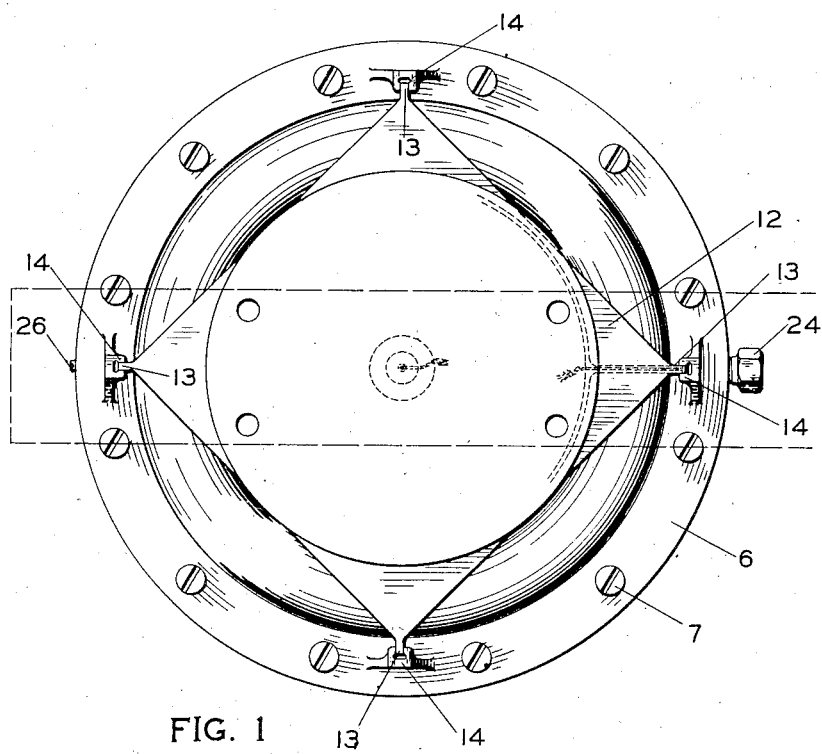
Figure 2:
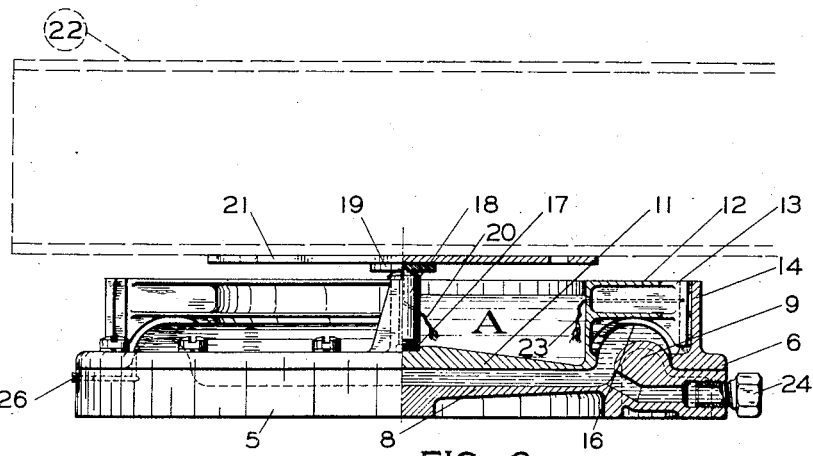
Figure 3:
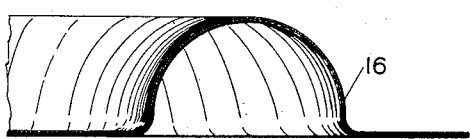

In the accompanying drawing forming a part of this specification and in which like numerals are employed to designate like parts throughout the same, Fig. 1 is a top plan view of my device, Fig. 2 is a side elevation partly in cross section of Fig. 1, and Fig. 3 is a fragmentary detail view of the laminated diaphragm.

In weighing apparatus it is common to employ a plurality of levers in order to indicate the vertical movement of a weighing platform at a distant point. These levers are subject to corrosion and dirt, and as a result there is a considerable variance in the weight of a load upon different scales. Applicant has, therefore, devised a hydraulic cell which may be employed in connection with weighing platforms and by transferring the hydraulic pressure from the cells which may be one or more, to a remote point without the employment of any levers, applicant is able to obtain an accurate weighing of the load.

In the accompanying drawing wherein for the purpose of illustration is shown a preferred embodiment of my invention, the numeral 5 designates a base plate and the numeral 6 a securing ring. The bottom plate and ring are connected together through the medium of screws 7. The bottom plate has a recessed portion 8 surrounded by a rim 9. The numeral 11 designates a top plate having a drop center portion and an upstanding rim 12. The rim is preferably square on its exterior surface so as to provide guide ribs 13, which engage in guideways 14 formed upon the ring 6. This plate 11 rests upon a diaphragm 16 preferably made of relatively thin laminated sheets as shown in Fig. 3. This diaphragm has its peripheral edge secured between the bottom plate 5 and ring 6. Mounted in the center of the top plate is a bearing 17 upon which rests a stud 18 having upper and lower bearing heads which in turn engages a bearing 19 secured to the underside of the platform plate 21, the platform being shown in dotted lines at 22. In order to lubricate the bearings 17 and 19, as well as the sliding surfaces between the guides 13 and 14, I preferably fill the center of the top casting with oil A and through the medium of wicks 20 and 23, I conduct this oil to the bearings 19 and bearing surfaces 13 and 14, respectively. Any means of filling the space between the bottom or base plate 5 and the diaphragm 16 may be employed, and I show in the present instance a removable plug 24. Pressure from the cell may be conducted to any remote point through the medium of a pipe, which pipe communicates with the fluid within the cell. This pipe may connect in the place of the plug 24, if desired. At 26, I show means for bleeding out any air which may be trapped in the device.

The construction of my device is such that a considerable area of liquid under the diaphragm 16 and the top plate 11 supports the load and therefore the relative up and down movement is exceedingly small. Therefore, the flexing of the diaphragm 16 is not a sufficient amount to cause any mechanical difficulties. The mounting of the top plate 11 is such that the same is always guided in a vertical direction, thus eliminating any strain which might be transmitted to the diaphragm through side movement. Further the mounting of the stud 18 is such that any side play which may occur in the platform cannot be transmitted to the capsule. All of the side play and end play of the platform will be taken care of by the usual parallel guide links as described in my co-pending application, Serial No. 694,734, filed October 23rd, 1933.

It is to be understood that the form of my invention herewith shown and described is to be taken as a preferred example of the same and that various changes in the material, size, shape and arrangement of parts may be resorted to without departing from the spirit of the invention or the scope of the subjoined claims.

Having thus described my invention, I claim:—

1. In a device of the character described, a base plate, a diaphragm supported on said base plate, a ring connected to said base plate and engaging the peripheral edge of said diaphragm, guide-ways formed in said ring, a top plate positioned on said diaphragm and having ribs movably supported in said guide-ways, and a freely movable support comprising a bearing member positioned on said top plate and capable of transmitting a load to said diaphragm without transmitting side movement.

2. In a device of the class described, a base plate having a rim formed thereon, a diaphragm supported on said base plate, a ring mounted on said base plate and engaging the peripheral edge of said diaphragm, guide-ways formed in said ring, a top plate resting on said diaphragm and having guide ribs movable in said guide-ways, and a freely movable supporting member having headed ends positioned on said top plate and capable of transmitting a load to said diaphragm without lateral movement.

3. In a device of the class described, a base plate having a rim formed thereon, a diaphragm supported on said base plate, a ring mounted on said base plate and engaging the peripheral edge of said diaphragm, guide-ways formed in said ring, a top plate resting on said diaphragm and having guide ribs movable in said guide-ways and having a bearing member mounted thereon, a platform plate arranged above said top plate and having a bearing member, and a freely movable support positioned on said plate bearing member and engaging said platform plate bearing, whereby lateral thrusts transmitted to said platform plate are absorbed by said support.

JOSEPH B. STRAUSS.